United States Patent
Zhang et al.

(10) Patent No.: US 12,153,953 B2
(45) Date of Patent: Nov. 26, 2024

(54) INTELLIGENT IDENTIFICATION OF AN EXECUTION ENVIRONMENT

(71) Applicant: International Business Machines Corporation, Armonk, NY (US)

(72) Inventors: A Peng Zhang, Xian (CN); Lei Gao, Xian (CN); Jin Wang, Xian (CN); Jing James Xu, Xian (CN); Jun Wang, Xian (CN); Dong Hai Yu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 17/225,427

(22) Filed: Apr. 8, 2021

(65) Prior Publication Data
US 2022/0326982 A1 Oct. 13, 2022

(51) Int. Cl.
*G06F 9/48* (2006.01)
*G06F 9/50* (2006.01)
(Continued)

(52) U.S. Cl.
CPC .......... *G06F 9/4843* (2013.01); *G06F 9/5027* (2013.01); *G06F 11/3024* (2013.01);
(Continued)

(58) Field of Classification Search
None
See application file for complete search history.

(56) References Cited

U.S. PATENT DOCUMENTS 7,844,968 B1 * 11/2010 Markov ................ G06F 9/4881
718/103
8,352,951 B2 1/2013 Das et al.
(Continued)

FOREIGN PATENT DOCUMENTS

| CN | 106874115 A | 6/2017 |
|---|---|---|
| CN | 109564525 A | 4/2019 |

(Continued)

OTHER PUBLICATIONS

International Search Report and Written Opinion dated Jun. 29, 2022 for International Application No. PCT/CN2022/08558, 10 pages.

(Continued)

*Primary Examiner* — Hiren P Patel
(74) *Attorney, Agent, or Firm* — Stephen J. Walder, Jr.; Matt Zehrer

(57) ABSTRACT

Mechanisms are provided for intelligently identifying an execution environment to execute a computing job. An execution time of the computing job in each execution environment of a plurality of execution environments is predicted by applying a set of existing machine learning models matching execution context information and key parameters of the computing job and execution environment information of the execution environment. The predicted execution time of the machine learning models is aggregated. The aggregated predicted execution times of the computing job are summarized for the plurality of execution environments. Responsive to a selection of an execution environment from the plurality of execution environments based on the summary of the aggregated predicted execution times of the computing job, the computing job is executed in the selected execution environment. Related data during the execution of the computing job in the selected execution environment is collected.

25 Claims, 5 Drawing Sheets

(51) Int. Cl.
  *G06F 11/30*  (2006.01)
  *G06F 11/34*  (2006.01)
  *G06F 12/0893*  (2016.01)
  *G06N 20/00*  (2019.01)
(52) U.S. Cl.
  CPC ...... *G06F 11/3495* (2013.01); *G06F 12/0893* (2013.01); *G06N 20/00* (2019.01); *G06F 2209/501* (2013.01); *G06F 2212/1016* (2013.01)

(56) References Cited

U.S. PATENT DOCUMENTS

| | | | |
|---|---|---|---|
| 8,359,223 B2 | 1/2013 | Chi et al. | |
| 9,356,883 B1 | 3/2016 | Borthakur | |
| 9,471,383 B2* | 10/2016 | Paul | G06F 9/505 |
| 10,419,530 B2 | 9/2019 | Halpern et al. | |
| 10,831,645 B1* | 11/2020 | McNeil | G06F 11/302 |
| 10,983,904 B1* | 4/2021 | Sundararaman | G06F 11/3664 |
| 11,256,609 B1* | 2/2022 | Agrawal | G06F 11/3684 |
| 11,762,860 B1* | 9/2023 | Rahman | G06F 16/24539 707/769 |
| 11,880,364 B2* | 1/2024 | Jiang | G06F 16/24542 |
| 2012/0198466 A1* | 8/2012 | Cherkasova | G06F 9/5066 718/104 |
| 2013/0185729 A1 | 7/2013 | Vasic et al. | |
| 2014/0237477 A1* | 8/2014 | Cadambi | G06F 9/5044 718/103 |
| 2016/0098292 A1* | 4/2016 | Boutin | G06F 9/4881 718/104 |
| 2016/0203404 A1* | 7/2016 | Cherkasova | G06N 5/04 706/12 |
| 2017/0371703 A1 | 12/2017 | Wagner et al. | |
| 2018/0026905 A1 | 1/2018 | Balle et al. | |
| 2018/0081715 A1* | 3/2018 | LeBeane | G06F 9/505 |
| 2018/0103088 A1* | 4/2018 | Blainey | H04L 67/10 |
| 2018/0181390 A1* | 6/2018 | Lepcha | G06F 9/5061 |
| 2018/0212842 A1 | 7/2018 | Ganguli et al. | |
| 2018/0321980 A1 | 11/2018 | Lo et al. | |
| 2019/0079796 A1 | 3/2019 | Ashara et al. | |
| 2019/0303207 A1* | 10/2019 | Vadapandeshwara | G06F 9/4843 |
| 2020/0264927 A1 | 8/2020 | Saha et al. | |
| 2020/0342068 A1 | 10/2020 | Cai et al. | |
| 2021/0034374 A1* | 2/2021 | Saxena | G06F 9/3891 |
| 2021/0174206 A1* | 6/2021 | Oskooi | G06F 30/27 |
| 2022/0147430 A1* | 5/2022 | Haas Costa | G06F 11/3466 |
| 2022/0237482 A1* | 7/2022 | Ben Arie | G06N 5/04 |
| 2022/0318017 A1* | 10/2022 | Garg | G06F 9/3802 |
| 2023/0042890 A1* | 2/2023 | Wen | G06F 9/5083 |

FOREIGN PATENT DOCUMENTS

| | | |
|---|---|---|
| CN | 109981749 A | 7/2019 |
| CN | 110688993 A | 1/2020 |
| JP | H11259433 A | 7/2006 |
| KR | 102030128 B1 | 11/2019 |
| WO | WO2018/005500 A1 | 4/2018 |
| WO | WO2020/001320 A1 | 1/2020 |

OTHER PUBLICATIONS

Ahuja, Kartik, "Optimization Methods for Resource Allocation and Machine Learning Applications", UCLA. ProQuest ID: Ahuja_ucla_0031D_18208. Merritt ID: ark:/13030/m5hj1pc4. Retrieved from https://escholarship.org/uc/item/7wt8n5wk on Feb. 4, 2021, 291 pages. Publication date 2019.

Csaji, Csanad B. et al., "Adaptive Stochastic Resource Control: A Machine Learning Approach", Journal of Artificial Intelligence Research 32 (2008) Submitted Feb. 2008; published Jun. 2008, 34 pages.

Pham, Thanh-Phuong et al., "Predicting Workflow Task Execution Time in the Cloud Using a Two-Stage Machine Learning Approach", IEEE Transactions on Cloud Computing, vol. 8, No. 1, Jan.-Mar. 2020, 13 pages.

Saraf, Surendra, "Using Machine Learning for Resource Allocation in Healthcare", https://www.faichi.com/blog/using-machine-learning-resource-allocationhealthcare, Feb. 14, 2020, 4 pages.

Wang, Jun-Bo et al., "A Machine Learning Framework for Resource Allocation Assisted by Cloud Computing", IEEE Network, vol. 32, No. 2, pp. 144-151, Mar.-Apr. 2018, 19 pages.

Yang, Renyu et al., "Intelligent Resource Scheduling at Scale: A Machine Learning Perspective", 2018 IEEE Symposium on Service-Oriented System Engineering (SOSE), Bamberg, Mar. 2018, 10 pages.

* cited by examiner

INTELLIGENT IDENTIFICATION OF AN EXECUTION ENVIRONMENT

BACKGROUND

The present application relates generally to an improved data processing apparatus and method and more specifically to mechanisms for intelligently identifying an execution environment for computing job execution.

In computing, a job is a unit of work or unit of execution (that performs said work). A component of a job (as a unit of work) is called a task or a step (if sequential, as in a job stream). As a unit of execution, a job may be concretely identified with a single process, which may in turn have subprocesses (child processes; each subprocess corresponding to the job of the parent process) which perform the tasks or steps that comprise the work of the job; or with a process group; or with an abstract reference to a process or process group.

Jobs may be started interactively, such as from a command line, or scheduled for non-interactive execution by a job scheduler, and then controlled via automatic or manual job control. Jobs that have finite input can complete, successfully or unsuccessfully, or fail to complete and eventually be terminated. By contrast, online processing such as by servers has open-ended input (they service requests as long as they run), and thus never complete, only stopping when terminated (sometimes called "canceled").

In an execution environment of a data processing system where a computing job is executed, there are usually several nodes in the execution flow, each node performing a particular operation on input data and producing output data, which may be utilized by a downstream node or presented as a final result. Currently, users identify an execution flow of the computing job based on the nodes required to complete the executing of the computing job and then select an execution environment for the computing job based on experience and expectations to execute the execution flow of the computing job. However, making the correct selection of an execution environment for the computing job may be difficult if the user lacks experience or the execution flow of the computing job is complex. For example, if the execution flow of the computing job is lightweight, there may be a waste of resources and more cost if the selected execution environment is large. As a further example, if the execution flow of the computing job is heavyweight and the selected execution environment is small, the execution time of the computing job may be too long.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for intelligently identifying an execution environment to execute a computing job. For each execution environment of a plurality of execution environments, the illustrative embodiment predicts an execution time of the computing job in the execution environment by applying a set of existing machine learning models matching execution context information and key parameters of the computing job and execution environment information of the execution environment; and aggregates the predicted execution time of the machine learning models thereby forming an aggregated predicted execution time for the computing job in the execution environment. The illustrative embodiment summarizes the aggregated predicted execution times of the computing job for the plurality of execution environments. The illustrative embodiment executes the computing job in the selected execution environment in response to a selection of an execution environment from the plurality of execution environments based on the summary of the aggregated predicted execution times of the computing job. The illustrative embodiment collects related data during the execution of the computing job in the selected execution environment. Thus, by providing an estimated execution time for the computing job on all available candidate execution environments, the illustrative embodiment provides a method for a selection of a suitable execution environment based on performance without a waste of resources or additional cost.

Within the illustrative embodiment the selection of the execution environment from the plurality of execution environments is based on the summary of aggregated predicted execution times of the computing job by either a user selection or an automated selection based on predefined user preferences. This provides for advantages of a user controlled systems or fully automated system. Additionally, within the illustrative embodiment, the execution context information is selected from the group comprising: size of input data; number of fields; number of categorical fields; number of continuous fields; univariate statistics of categorical fields; univariate statistics of continuous fields; metadata; and parameters, the key parameters are identified based on values associated with the execution context information for the computing job; and the execution environment information is selected from the group comprising: number of processors, characteristics of the processors, memory size, software development information, and operation system information. Providing a vast flexibility in components for predicting an execution time of the computing job allow user flexibility in identifying a suitable execution environment.

Within the illustrative embodiment, the set of existing machine learning models are generated by: collecting execution context information for a plurality of test cases; identifying key parameters using the values associated with each of the execution context information for the plurality of test cases; collecting execution environment information for each of the plurality of execution environments; executing each test case in the plurality of test cases in each execution environment of the plurality of execution environments utilizing the collected execution context information for each of the plurality of test case and the execution environment information for each of the plurality of execution environments; generating the set of machine learning models based on the relationship between execution time of each test case in an associated execution environment and execution context of the associated test case; and assigning an initial weight to each machine learning model in the set of machine learning models. Further, within the illustrative embodiment, the set of machine learning models for each execution environment of the plurality of execution environments comprises: one base machine learning model that uses all of the execution context information of the test case, values associated with each of the execution context information of the test case, and all associated execution environment information; and at least one lite machine learning model that includes some but not all of the execution context information of the test case, values associated with each of the execution context information of the test case, and all associated execution environment information. Generating machine learning models in this manner provides for greater accuracy in predicting the execution time of the computing job when utilized in real time.

Within the illustrative embodiment, updating the set of machine learning models utilized in identifying an execution environment to execute the computing job is performed by: adding the related data that is collected for the selected execution environment into a data cache; responsive to a number of records in the data cache being larger than a first predetermined value: calculating a model accuracy based on the cached data; and retraining at least one lite machine learning model in the set of machine learning models by adjusting a weight of the lite machine learning model based on the calculated model accuracy; and responsive to the number of records in the data cache being larger than a second predetermined value: determining whether an accuracy of a base model in the set of machine learning models is less than a predefined threshold ($T_{acc}$); responsive to the accuracy of the base model being less than the predefined threshold ($T_{acc}$), generating a new base machine learning model using the cached data; and replacing an existing base machine learning model for the associated execution environment with the newly generated base machine learning model for the associated execution environment in the set of machine learning models. Within the illustrative embodiment, the newly generated base machine learning model and each of the lite machine learning models associated with the execution environment is retrained by assigning new weights. By retaining the machine learning models in this manner predicting the execution time of the computing job becomes more accurate over time.

In another illustrative embodiment, a computer program product comprising a computer useable or readable medium having a computer readable program is provided. The computer readable program, when executed on a computing device, causes the computing device to, in this illustrative embodiment, for each execution environment of a plurality of execution environments: predict an execution time of the computing job in the execution environment by applying a set of existing machine learning models matching execution context information and key parameters of the computing job and execution environment information of the execution environment; and aggregate the predicted execution time of the machine learning models thereby forming an aggregated predicted execution time for the computing job in the execution environment. In this illustrative embodiment, the aggregated predicted execution times of the computing job are summarized for the plurality of execution environments. This illustrative embodiment executes the computing job in the selected execution environment in response to a selection of an execution environment from the plurality of execution environments based on the summary of the aggregated predicted execution times of the computing job. This illustrative embodiment collects related data during the execution of the computing job in the selected execution environment. Thus, by providing an estimated execution time for the computing job on all available candidate execution environments, this illustrative embodiment provides a computer program product for a selection of a suitable execution environment based on performance without a waste of resources or additional cost.

Within this illustrative embodiment the selection of the execution environment from the plurality of execution environments is based on the summary of aggregated predicted execution times of the computing job by either a user selection or an automated selection based on predefined user preferences. This provides for advantages of a user controlled systems or fully automated system. Additionally, within this illustrative embodiment, the execution context information is selected from the group comprising: size of input data; number of fields; number of categorical fields; number of continuous fields; univariate statistics of categorical fields; univariate statistics of continuous fields; metadata; and parameters, the key parameters are identified based on values associated with the execution context information for the computing job; and the execution environment information is selected from the group comprising: number of processors, characteristics of the processors, memory size, software development information, and operation system information. Providing a vast flexibility in components for predicting an execution time of the computing job allow user flexibility in identifying a suitable execution environment.

Within this illustrative embodiment, the set of existing machine learning models are generated by the computer readable program further causing the computing device to: collect execution context information for a plurality of test cases; identify key parameters using the values associated with each of the execution context information for the plurality of test cases; collect execution environment information for each of the plurality of execution environments; execute each test case in the plurality of test cases in each execution environment of the plurality of execution environments utilizing the collected execution context information for each of the plurality of test case and the execution environment information for each of the plurality of execution environments; generate the set of machine learning models based on the relationship between execution time of each test case in an associated execution environment and execution context of the associated test case; and assign an initial weight to each machine learning model in the set of machine learning models. Further, within this illustrative embodiment, the set of machine learning models for each execution environment of the plurality of execution environments comprises: one base machine learning model that uses all of the execution context information of the test case, values associated with each of the execution context information of the test case, and all associated execution environment information; and at least one lite machine learning model that includes some but not all of the execution context information of the test case, values associated with each of the execution context information of the test case, and all associated execution environment information. Generating machine learning models in this manner provides for greater accuracy in predicting the execution time of the computing job when utilized in real time.

Within the illustrative embodiment, the computer readable program updates the set of machine learning models utilized in identifying an execution environment to execute the computing job by further causing the computing device to: add the related data that is collected for the selected execution environment into a data cache; responsive to a number of records in the data cache being larger than a first predetermined value: calculate a model accuracy based on the cached data; and retrain at least one lite machine learning model in the set of machine learning models by adjusting a weight of the lite machine learning model based on the calculated model accuracy; and responsive to the number of records in the data cache being larger than a second predetermined value: determine whether an accuracy of a base model in the set of machine learning models is less than a predefined threshold ($T_{acc}$); responsive to the accuracy of the base model being less than the predefined threshold ($T_{acc}$), generate a new base machine learning model using the cached data; and replace an existing base machine learning model for the associated execution environment with the newly generated base machine learning model for the associated execution environment in the set of machine learning models. Within the illustrative embodiment, the newly generated base machine learning model and each of the lite machine learning models associated with the execution environment is retrained by assigning new weights. By retaining the machine learning models in this manner predicting the execution time of the computing job becomes more accurate over time.

In yet another illustrative embodiment, a system/apparatus is provided. The system/apparatus may comprise one or more processors and a memory coupled to the one or more processors. The memory may comprise instructions which, when executed by the one or more processors, cause the one or more processors to, in this illustrative embodiment, for each execution environment of a plurality of execution environments: predict an execution time of the computing job in the execution environment by applying a set of existing machine learning models matching execution context information and key parameters of the computing job and execution environment information of the execution environment; and aggregate the predicted execution time of the machine learning models thereby forming an aggregated predicted execution time for the computing job in the execution environment. In this illustrative embodiment, the aggregated predicted execution times of the computing job are summarized for the plurality of execution environments. This illustrative embodiment executes the computing job in the selected execution environment in response to a selection of an execution environment from the plurality of execution environments based on the summary of the aggregated predicted execution times of the computing job. In this illustrative embodiment, related data is collected during the execution of the computing job in the selected execution environment. Thus, by providing an estimated execution time for the computing job on all available candidate execution environments, this illustrative embodiment provides a system/apparatus for a selection of a suitable execution environment based on performance without a waste of resources or additional cost.

Within this illustrative embodiment the selection of the execution environment from the plurality of execution environments is based on the summary of aggregated predicted execution times of the computing job by either a user selection or an automated selection based on predefined user preferences. This provides for advantages of a user controlled systems or fully automated system. Additionally, within this illustrative embodiment, the execution context information is selected from the group comprising: size of input data; number of fields; number of categorical fields; number of continuous fields; univariate statistics of categorical fields; univariate statistics of continuous fields; metadata; and parameters, the key parameters are identified based on values associated with the execution context information for the computing job; and the execution environment information is selected from the group comprising: number of processors, characteristics of the processors, memory size, software development information, and operation system information. Providing a vast flexibility in components for predicting an execution time of the computing job allow user flexibility in identifying a suitable execution environment.

Within this illustrative embodiment, the set of existing machine learning models are generated by the instructions further causing the processor to: collect execution context information for a plurality of test cases; identify key parameters using the values associated with each of the execution context information for the plurality of test cases; collect execution environment information for each of the plurality of execution environments; execute each test case in the plurality of test cases in each execution environment of the plurality of execution environments utilizing the collected execution context information for each of the plurality of test case and the execution environment information for each of the plurality of execution environments; generate the set of machine learning models based on the relationship between execution time of each test case in an associated execution environment and execution context of the associated test case; and assign an initial weight to each machine learning model in the set of machine learning models. Further, within this illustrative embodiment, the set of machine learning models for each execution environment of the plurality of execution environments comprises: one base machine learning model that uses all of the execution context information of the test case, values associated with each of the execution context information of the test case, and all associated execution environment information; and at least one lite machine learning model that includes some but not all of the execution context information of the test case, values associated with each of the execution context information of the test case, and all associated execution environment information. Generating machine learning models in this manner provides for greater accuracy in predicting the execution time of the computing job when utilized in real time.

Within this illustrative embodiment, the instructions update the set of machine learning models utilized in identifying an execution environment to execute the computing job by further causing the processor to: add the related data that is collected for the selected execution environment into a data cache; responsive to a number of records in the data cache being larger than a first predetermined value: calculate a model accuracy based on the cached data; and retrain at least one lite machine learning model in the set of machine learning models by adjusting a weight of the lite machine learning model based on the calculated model accuracy; and responsive to the number of records in the data cache being larger than a second predetermined value: determine whether an accuracy of a base model in the set of machine learning models is less than a predefined threshold ($T_{acc}$); responsive to the accuracy of the base model being less than the predefined threshold ($T_{acc}$), generate a new base machine learning model using the cached data; and replace an existing base machine learning model for the associated execution environment with the newly generated base machine learning model for the associated execution environment in the set of machine learning models. Within the illustrative embodiment, the newly generated base machine learning model and each of the lite machine learning models associated with the execution environment is retrained by assigning new weights. By retaining the machine learning models in this manner predicting the execution time of the computing job becomes more accurate over time.

In still another illustrative embodiment, a method, in a data processing system, is provided for intelligently identifying an execution environment to execute a computing job. The illustrative embodiment identifies an aggregated predicted execution time for the computing job in each execution environment of a plurality of execution environments. The illustrative embodiment executes the computing job in the selected execution environment in response to a selection of an execution environment from the plurality of execution environments based on a summary of aggregated predicted execution times of computing job. The illustrative embodiment collects related data during the execution of the computing job in the selected execution environment. Thus, by providing an estimated execution time for the computing job on all available candidate execution environments, the illustrative embodiment provides a method for a selection of a suitable execution environment based on performance without a waste of resources or additional cost.

In another illustrative embodiment, a computer program product comprising a computer useable or readable medium having a computer readable program is provided. The computer readable program, when executed on a computing device, causes the computing device to, in this illustrative embodiment, identify an aggregated predicted execution time for the computing job in each execution environment of a plurality of execution environments. In this illustrative embodiment, the computing job is executed in the selected execution environment in response to a selection of an execution environment from the plurality of execution environments based on a summary of aggregated predicted execution times of computing job. In this illustrative embodiment, related data is collected during the execution of the computing job in the selected execution environment. Thus, by providing an estimated execution time for the computing job on all available candidate execution environments, the illustrative embodiment provides a computer program product for a selection of a suitable execution environment based on performance without a waste of resources or additional cost.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
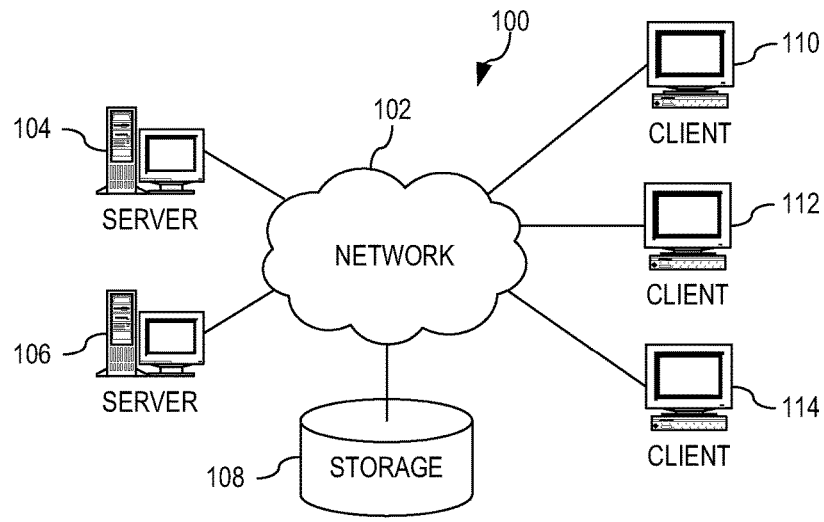
FIG. 1 is an example diagram of a distributed data processing system in which aspects of the illustrative embodiments may be implemented.

As noted previously, in an execution environment of a data processing system, there are usually several nodes in the execution flow, each node performing a particular operation on input data and producing output data, which may be utilized by a downstream node or presented as a final result. Currently, users identify an execution flow of the computing job based on the nodes required to complete the executing of the computing job and then select an execution environment for the computing job based on experience and expectations to execute the execution flow of the computing job. However, making the correct selection of an execution environment for the computing job may be difficult if the user lacks experience or the execution flow of the computing job is complex. For example, if the execution flow of the computing job is lightweight, there may be a waste of resources and more cost if the selected execution environment is large. As a further example, if the execution flow of the computing job is heavyweight and the selected execution environment is small, the execution time of the computing job may be too long.

Thus, the illustrative embodiments provide mechanisms for intelligently identifying an execution environment to execute a computing job. The mechanisms build machine learning models to reflect the relationship between job execution time and execution context, such as execution environment, input data information, key parameters, or the like. The mechanisms then estimate an execution time for executing the execution flow of the computing job in each candidate execution environment of a plurality of execution environments based on machine learning models for each execution environment in the plurality of execution environments in order to provide several combinations of execution environments and execution times as options for selection before the actual computing job execution. That is, the mechanisms may inform the user of job magnitude (heavyweight or lightweight) and an estimated execution time on all available candidate execution environments, so that the user may select a suitable execution environment based on performance or so that the mechanisms may automatically select an execution environment based on predefined user preferences. After each computing job execution in a selected execution environment, the mechanisms collect execution information and refresh the associated machine learning models.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
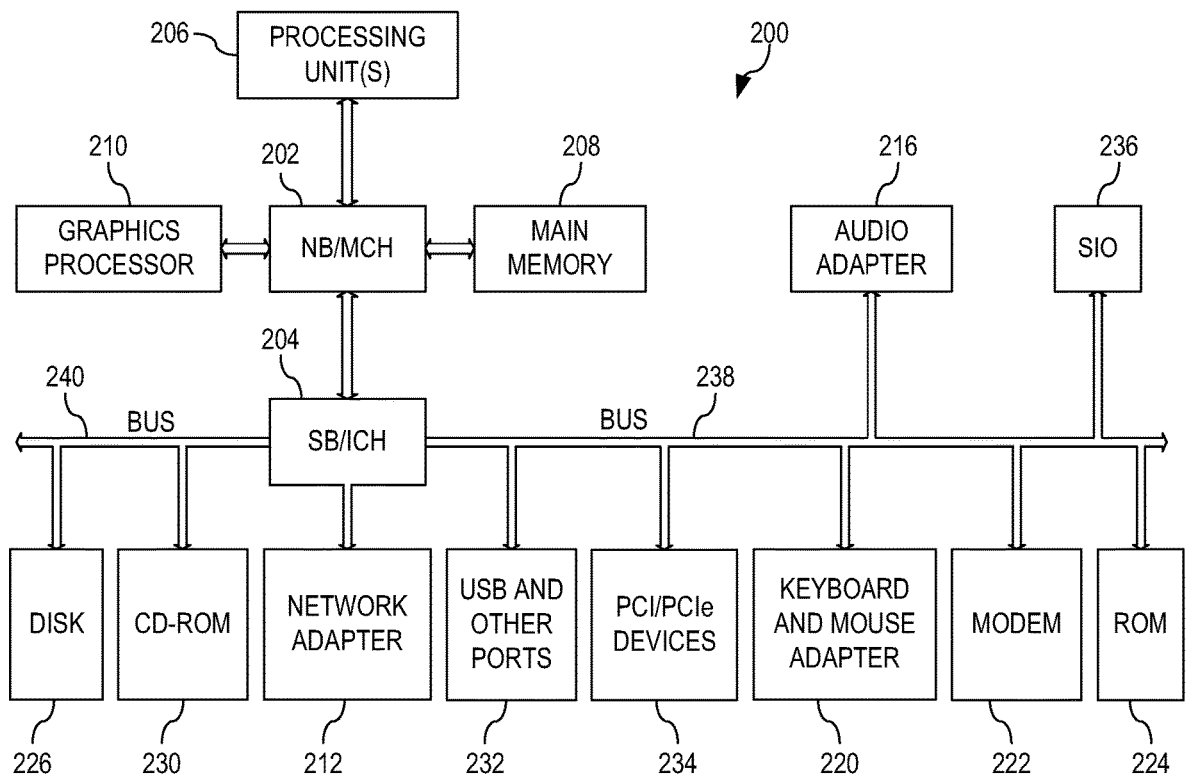
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications, i.e. execution environments, to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an intelligent execution environment identification mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates intelligently identifying an execution environment for computing job execution.

As noted above, the mechanisms of the illustrative embodiments utilize specifically configured computing devices, or data processing systems, to perform the operations for intelligently identifying an execution environment for computing job execution. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanisms for intelligently identifying an execution environment for computing job execution.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The illustrative embodiments may be utilized in many different types of data processing environments. In order to provide a context for the description of the specific elements and functionality of the illustrative embodiments, FIGS. 1 and 2 are provided as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

In accordance with one illustrative embodiment, FIGS. 1 and 2 are directed to describing an example cognitive system for intelligently identifying an execution environment for computing job execution, which implements a request processing pipeline, request processing methodology, and request processing computer program product with which the mechanisms of the illustrative embodiments are implemented. These requests may be provided as structure or unstructured request messages, natural language questions, or any other suitable format for requesting an operation to be performed by the cognitive system. As described in more detail hereafter, the particular application that is implemented in the cognitive system of the present invention is an application for intelligently identifying an execution environment for computing job execution.

As an overview, a cognitive system is a specialized computer system, or set of computer systems, configured with hardware and/or software logic (in combination with hardware logic upon which the software executes). A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, request processing, identification of execution environments and their capabilities, intelligent search algorithms, or the like.

Figure 3:
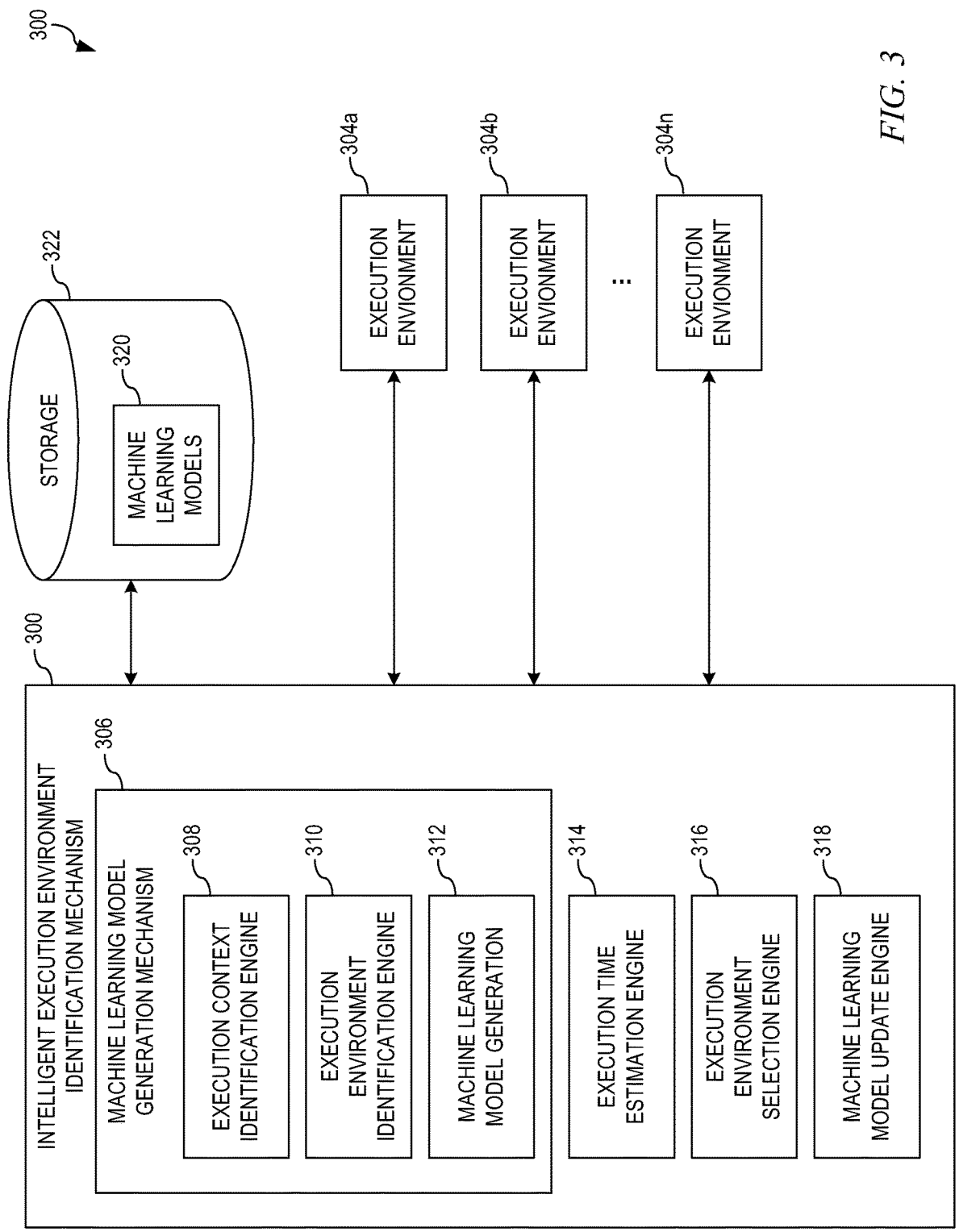
FIG. 3 depicts one example of a functional block diagram of a data processing system for intelligently identifying an execution environment for computing job execution in accordance with an illustrative embodiment.

FIG. 3 depicts one example of a functional block diagram of a data processing system for intelligently identifying an execution environment for computing job execution in accordance with an illustrative embodiment. Data processing system 300, which is a data processing system such as data processing system 200 of FIG. 2 operating on a client device such as clients 110, 112, or 114 of FIG. 1, comprises intelligent execution environment identification mechanism 302 which is communicatively coupled to a plurality of execution environments 304a, 304b, . . . , 304n, such as server 104 or 106 of FIG. 1. In order to identify an optimal execution environment from the plurality of execution environments 304a-304n, intelligent execution environment identification mechanism 302 comprises machine learning model generation mechanism 306, execution time estimation engine 314, execution environment selection engine 316, and machine learning model update engine 318.

As intelligent execution environment identification mechanism 302 is initialized, machine learning model generation mechanism 306 generates a plurality of machine learning models 320 for each of the plurality of execution environments 304a-304n. Each machine learning model in the plurality of machine learning models 320 for each execution environment in the plurality of execution environments 304a-304n models the execution of a particular computing job in the execution environment based on characteristics of the input data of the particular computing job and characteristics of the execution environment. In order to generate each machine learning model for each execution environment, execution context identification engine 308 in machine learning model generation mechanism 306 collects execution context information for a plurality of test cases. The plurality of tests cases cover a variety of input data that test all or a portion of nodes capabilities within each execution environment so as to accurately test the functionality of the execution environment using all or a portion of the nodes the form the execution environment. Thus, execution context identification engine 308 collects execution context information for each of the test cases that may include but is not limited to size of input data; number of fields; number of categorical fields; number of continuous fields; univariate statistics of categorical fields, such as number of categories, percentage of each categories, or the like; univariate statistics of continuous fields, such as min, max, mean, standard deviation, variance, standard error, or the like; metadata; parameters; or the like. Once collected, execution context identification engine 308 may transform the execution context information, which may also be referred to as input data, if necessary. In one embodiment, execution context identification engine 308 may perform feature scaling and then count a number of values in equal width interval. In another embodiment, execution context identification engine 308 may perform binning to transform continuous variable into categorical variable. In one embodiment, execution context identification engine 308 may perform merging to reduce number of categories of a categorical variable. Execution context identification engine 308 then identifies the values associated with each of the execution context information so as to provide key parameters in the generation of the machine learning models.

Additionally, in order to generate each machine learning model for each execution environment, execution environment identification engine 310 in machine learning model generation mechanism 306 collects execution environment information for each of the plurality of execution environments 304a-304n. Thus, execution environment identification engine 310 collects execution environment information for each of the test cases that may include but is not limited to number of processors, characteristics of the processors, memory size, software development information, operation system information, or the like.

Utilizing the collected execution context information for each of the plurality of test case and the execution environment information for each of the plurality of execution environments 304a-304n, machine learning model generation engine 312 in machine learning model generation mechanism 306 runs each test case in the plurality of test cases in each execution environment of the plurality of execution environments 304a-304n that has the possibility of executing the test case. That is, based on the capabilities of a particular execution environment and the requirements of the execution context information, one or more of the plurality of execution environments 304a-304n may not be able to execute a particular test case. Thus, a machine learning model for that particular execution environment under that test case would not be established. However, for each execution environment in the plurality of execution environments 304a-304n where a test case in the plurality of test cases can be executed, machine learning model generation mechanism 306 runs the test case and records an execution time of the test case.

Once all tests cases have been executed, machine learning model generation engine 312 generates a set of machine learning models, such as a Linear Regression Model, Regression Tree Model, or the like, for the relationship between execution time of the test cases in the execution environment and execution context of the associated test case. In one example embodiment, the model may be $$Y=f(X)$$

where Y is the execution time, X is the execution information (execution context information and execution environment information), and f(X) is the model. Machine learning model generation engine 312 generates one base machine learning model BM with all collected information, i.e. all of the execution context information, values associated with each of the execution context information, and execution environment information as predictors. In addition to generating the one base machine learning model BM, machine learning model generation engine 312 generates a number N lite machine learning models LM (e.g. when N=5 machine learning model generation engine 312 generates LM1, LM2, LM3, LM4, and LM5) with a portion of the collected information, that is some but not all of the execution context information, values associated with each of the execution context information, and execution environment information as predictors. In one example embodiment, the number N may be determined by taking a square root of a number of predictors. In one example embodiment, the portion of the collected information may include fixed key predictors, such as number of processors, memory size, or the like and option predictors, such as metadata, parameters, or the like.

For each of the base machine learning model BM and the lite machine learning models LM1-LM$_N$, machine learning model generation engine 312 assigns an initial weight WBM for BM, and WLM$_N$ for LM$_N$. In one example, machine learning model generation engine 312 may assign weights such that:

WBM=w1 where 0<w1<1
WLMn=(1−w1)/N.

In this example, when N=5 and w1=0.5 the weights would be:

WBM=0.5,
WLM1=0.1,
WLM2=0.1,
WLM3=0.1,
WLM4=0.1,
WLM5=0.1.

In another example embodiment, machine learning model generation engine 312 may assign or modify weights based on model accuracy. Machine learning model generation engine 312 stores each of the machine learning models as machine learning models 320 in storage 322.

Again, each of machine learning models 320 are based on test cases in order for intelligent execution environment identification mechanism 302 to initially intelligently identify an execution environment for computing job execution. Therefore, when a user wants to execute a new computing job, execution time estimation engine 314 collects execution context information for the new computing job that may include but is not limited to size of input data; number of fields; number of categorical fields; number of continuous fields; univariate statistics of categorical fields, such as number of categories, percentage of each categories, or the like; univariate statistics of continuous fields, such as min, max, mean, standard deviation, variance, standard error, or the like; metadata; parameters; or the like. Execution time estimation engine 314 then identifies the values associated with each of the execution context information for the new computing job so as to provide key parameters in the generation of the machine learning models. Execution time estimation engine 314 also collects execution environment information for each of the plurality of execution environments 304a-304n that may include but is not limited to number of processors, characteristics of the processors, memory size, software development information, operation system information, or the like.

For each execution environment of the plurality of execution environments 304a-304n, execution time estimation engine 314 predicts an execution time of the execution environment by applying specific ones of the machine learning models 320 that match the execution context information and key parameters of the new computing job and the execution environment information of the associated execution environment so as to identify a predicted execution time ETB for each specific one of the base machine learning models of an associated execution environment and a predicted execution time ETLn for each specific ones of the lite machine learning models of an associated execution environment. For each execution environment, execution time estimation engine 314 aggregates the predicted execution time of base machine learning model and lite machine learning models so as to provide an aggregated execution time for the execution environment as follows:

$$\text{Execution Time}=ETB*WBM+\Sigma_{i=1}^{n}WLMi*ETLi.$$

Once the execution time estimation engine 314 has determined the aggregated execution time for each of the plurality of execution environments 304a-304n, execution environment selection engine 316 summarizes the execution time of new computing job in each execution environment. In one example embodiment, execution environment selection engine 316 presents the summary of the execution times to a user in a user interface so that the user may select an appropriate execution environment for the new computing job. In another example embodiment, execution environment selection engine 316 selects an appropriate execution environment to execute the new computing job based on predefined user preferences, i.e. a set of rules the user has identified prior to requesting the intelligent identification of an execution environment for computing job execution. Once the user has provided a selection of an execution environment or the execution environment selection engine 316 selects an execution environment based on the predefined user preferences, execution environment selection engine 316 executes the new computing job in the selected execution environment and collects related data during the execution.

The related data that is collected for the selected execution environment may be indicative of change in the execution environment since the test cases were run or since the last time user submitted computing job was executed, such as difference in hardware: virtual machine versus physical hardware, hard disk drive versus solid state drive, or the like; an update in a dependency library: optimization, central processing unit versus graphics processing unit; hardware replacement and improvement; or the like. Thus, with the changes that may incur in an execution environment, machine learning model update engine 318 retrains the machine learning models associated with the selected execution environment. Machine learning model update engine 318 updates both the base machine learning model of the associated execution environment and each of the lite machine learning models of the associated execution environment.

In order to update the base machine learning model of the associated execution environment and each of the lite machine learning models of the associated execution environment, machine learning model update engine 318 adds the related data that is collected for the selected execution environment, i.e. the collected execution context information for the new computing job, the key parameters, the execution environment information for the selected execution environment and the observed execution time, into a data cache. Machine learning model update engine 318 determines whether the number of records in the data cache is larger than a first predefined threshold $S_1$. If the number of records in the data cache is larger than $S_1$, machine learning model update engine 318 calculates a model accuracy $R^1$ based on the cached data. Machine learning model update engine 318 then retrains each lite machine learning model by adjusting the weight of the lite model based on calculated accuracy $(R^1)$ using the following formula:

$$adjWLM_i = \frac{R_i^1}{\sum_n R_n^1} * \sum_n WLM_n$$

Thus, machine learning model update engine 318 retrains each of the lite machine learning models by adjusting the weight associated with each lite machine learning model.

In order to make sure the lite models stay fresh based on their accuracy machine learning model update engine 318 continues to calculate an accuracy of each 'in use' lite models based on cached data. Machine learning model update engine 318 also builds new lite machine learning models based on the cached data and caches any lite machine learning model with accuracy larger than a first predefined threshold $(T_{acc1})$. When the accuracy of an 'in use' lite machine learning models is determined to be less than the first predefined threshold $(T_{acc1})$, machine learning model update engine 318 retrieves all 'in use' lite machine learning models and any cached lite machine learning models, sorts the mixed lite machine learning models by accuracy, and selects a top N lite machine learning models, which are then used as a new set of 'in use' lite machine learning models. Machine learning model update engine 318 may retain the new set of 'in use' lite machine learning models by reusing previously determined weights for the new set of 'in use' lite machine learning models or assigning new weight for selected lite machine learning models using the previously described weight adjustment formula.

For the base machine learning model, when the number of records in cached data is larger than a second predefined threshold $S_2$ and when an accuracy of base model is less than a second predefined threshold $(T_{acc2})$, machine learning model update engine 318 generates a new base machine learning model using the cached data. In this instance, machine learning model update engine 318 may retrain the base machine learning model and each of the lite machine learning models associated with the particular execution environment by either assigning new weight for selected machine learning models using the previously described weight adjustment formula or using the formula previously used for initial weight determination used during initial training of the base machine learning model and the lite machine learning models for the particular execution environment.

Thus, intelligent execution environment identification mechanism 302 provides an improvement over tradition execution environment selection as intelligent execution environment identification mechanism 302 retrains machine learning models after each computing job execution thereby improving the accuracy in intelligently identifying an execution environment for each next computing job execution. Intelligent execution environment identification mechanism 302 is also easy to use as no domain knowledge or experience is needed. Further, intelligent execution environment identification mechanism 302 is extensible because each execution environment node has its own separate set of machine learning models, i.e. a base machine learning model and a set of lite machine learning models.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
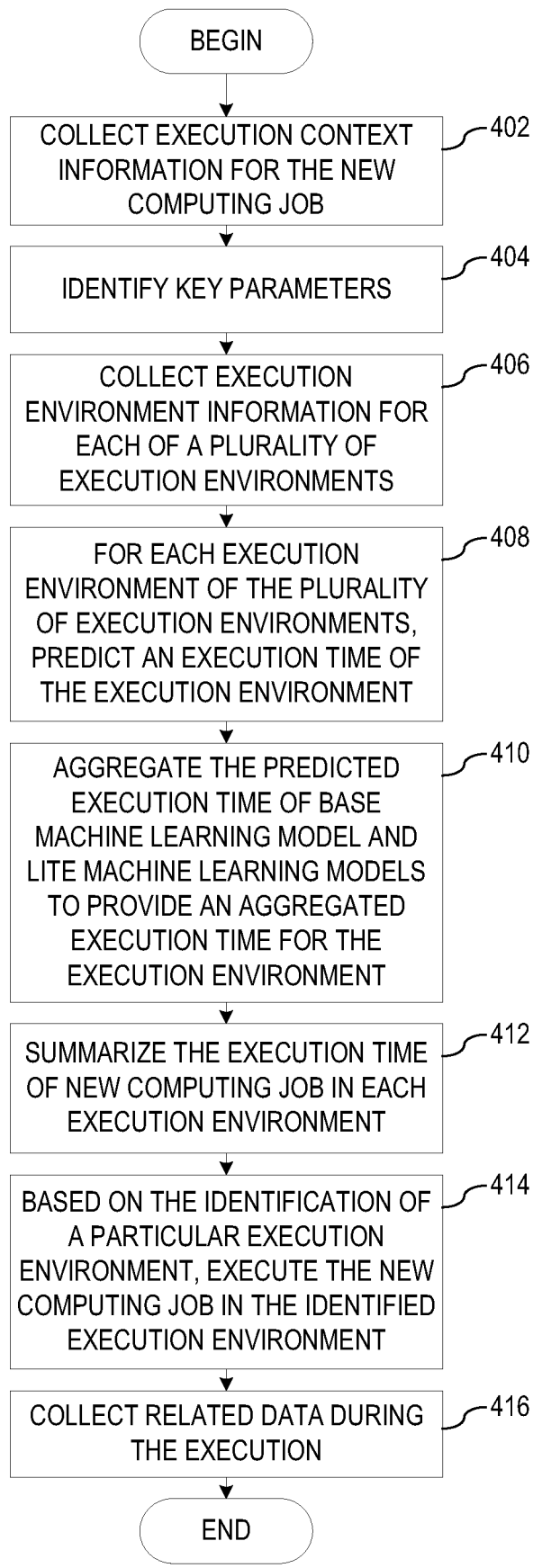
FIG. 4 depicts one example of a flow diagram of the operation performed by an intelligent execution environment identification mechanism in identifying an execution environment for execution of a new computing job in accordance with an illustrative embodiment.

FIG. 4 depicts one example of a flow diagram of the operation performed by an intelligent execution environment identification mechanism, such as intelligent execution environment identification mechanism 302 of FIG. 3, in identifying an execution environment for execution of a new computing job in accordance with an illustrative embodiment. As the operation begins, when a user submit a request to execute a new computing job, an execution time estimation engine of the intelligent execution environment identification mechanism collects execution context information for the new computing job (step 402). The execution context information may include but is not limited to size of input data; number of fields; number of categorical fields; number of continuous fields; univariate statistics of categorical fields, such as number of categories, percentage of each categories, or the like; univariate statistics of continuous fields, such as min, max, mean, standard deviation, variance, standard error, or the like; metadata; parameters; or the like. The execution time estimation engine then identifies the values associated with each of the execution context information for the new computing job so as to provide key parameters in the generation of the machine learning models (step 404). The execution time estimation engine also collects execution environment information for each of a plurality of execution environments (step 406). The execution environment information may include but is not limited to number of processors, characteristics of the processors, memory size, software development information, operation system information, or the like.

For each execution environment of the plurality of execution environments, the execution time estimation engine predicts an execution time of the execution environment (step 408). The execution time estimation engine does so by applying specific ones of a set of existing machine learning models that match the execution context information and key parameters of the new computing job and the execution environment information of the associated execution environment so as to identify a predicted execution time ETB for each specific one of the base machine learning models of an associated execution environment and a predicted execution time ETLn for each specific ones of the lite machine learning models of an associated execution environment. For each execution environment, the execution time estimation engine aggregates the predicted execution time of base machine learning model and lite machine learning models so as to provide an aggregated execution time for the execution environment (step 410) as follows:

$$\text{Execution Time} = ETB*WBM + \Sigma_{i=1}^{n} WLMi*ETLi.$$

Once the execution time estimation engine has determined the aggregated execution time for each of the plurality of execution environments, the execution environment selection engine summarizes the execution time of new computing job in each execution environment (step 412). In one example embodiment, the execution environment selection engine presents the summary of the execution times to a user in a user interface so that the user may select an appropriate execution environment for the new computing job. In another example embodiment, the execution environment selection engine selects an appropriate execution environment to execute the new computing job based on predefined user preferences, i.e. a set of rules the user has identified prior to requesting the intelligent identification of an execution environment for computing job execution. Once the user has provided a selection of an execution environment or the execution environment selection engine selects an execution environment based on the predefined user preferences, the execution environment selection engine executes the new computing job in the selected execution environment (step 414) and collects related data during the execution (step 416), with the operation ending thereafter.

Figure 5:
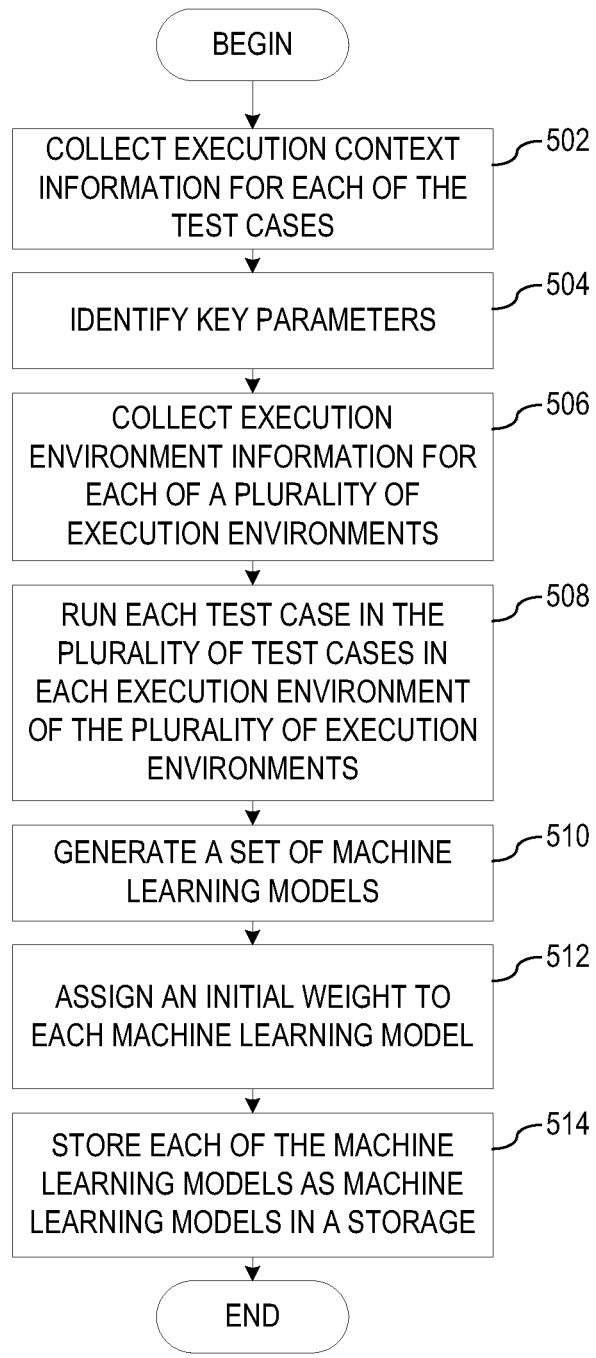
FIG. 5 depicts one example of a flow diagram of the operation performed in generating the set of existing machine learning models that are used by the execution time estimation engine of the intelligent execution environment identification mechanism in predicting an execution time of the execution environment in accordance with an illustrative embodiment.

FIG. 5 depicts one example of a flow diagram of the operation performed in generating the set of existing machine learning models that are used by the execution time estimation engine of the intelligent execution environment identification mechanism in predicting an execution time of the execution environment in accordance with an illustrative embodiment. As the operation begins, an execution context identification engine in a machine learning model generation mechanism of the intelligent execution environment identification mechanism collects execution context information for a plurality of test cases (step 502). The collected execution context information for each of the test cases may include but is not limited to size of input data; number of fields; number of categorical fields; number of continuous fields; univariate statistics of categorical fields, such as number of categories, percentage of each categories, or the like; univariate statistics of continuous fields, such as min, max, mean, standard deviation, variance, standard error, or the like; metadata; parameters; or the like. The execution context identification engine then identifies the values associated with each of the execution context information so as to provide key parameters in the generation of the machine learning models (step 504).

Additionally, an execution environment identification engine in the machine learning model generation mechanism of the intelligent execution environment identification mechanism collects execution environment information for each of the plurality of execution environments (step 506). The collected execution environment information for each of the test cases that may include but is not limited to number of processors, characteristics of the processors, memory size, software development information, operation system information, or the like.

Utilizing the collected execution context information for each of the plurality of test case and the execution environment information for each of the plurality of execution environments, a machine learning model generation engine in the machine learning model generation mechanism of the intelligent execution environment identification mechanism runs each test case in the plurality of test cases in each execution environment of the plurality of execution environments (step 508). Once all tests cases have been executed, the machine learning model generation engine generates a set of machine learning models, such as a Linear Regression Model, Regression Tree Model, or the like, for the relationship between execution time of the test cases in the execution environment and execution context of the associated test case (step 510). In one example embodiment, the model may be $$Y=f(X)$$

where Y is the execution time, X is the execution information (execution context information and execution environment information), and f(X) is the model. The machine learning model generation engine generates one base machine learning model BM with all collected information, i.e. all of the execution context information, values associated with each of the execution context information, and execution environment information as predictors. In addition to generating the one base machine learning model BM, the machine learning model generation engine generates a number N lite machine learning models LM (e.g. when N=5 machine learning model generation engine 312 generates LM1, LM2, LM3, LM4, and LM5) with a portion of the collected information, that is some but not all of the execution context information, values associated with each of the execution context information, and execution environment information as predictors. In one example embodiment, the number N may be determined by taking a square root of a number of predictors. In one example embodiment, the portion of the collected information may include fixed key predictors, such as number of processors, memory size, or the like and option predictors, such as metadata, parameters, or the like.

For each of the base machine learning model BM and the lite machine learning models LM1-LM$_N$, the machine learning model generation engine assigns an initial weight WBM for BM, and WLM$_N$ for LM$_N$ (step 512). In one example, machine learning model generation engine 312 may assign weights such that:
WBM=w1 where 0<w1<1
WLMn=(1−w1)/N.
In this example, when N=5 and w1=0.5 the weights would be:
WBM=0.5,
WLM1=0.1,
WLM2=0.1,
WLM3=0.1,
WLM4=0.1,
WLM5=0.1.

In another example embodiment, the machine learning model generation engine may assign or modify weights based on model accuracy. The machine learning model generation engine stores each of the machine learning models as machine learning models in a storage (step 514), with the operation ending thereafter.

Figure 6:
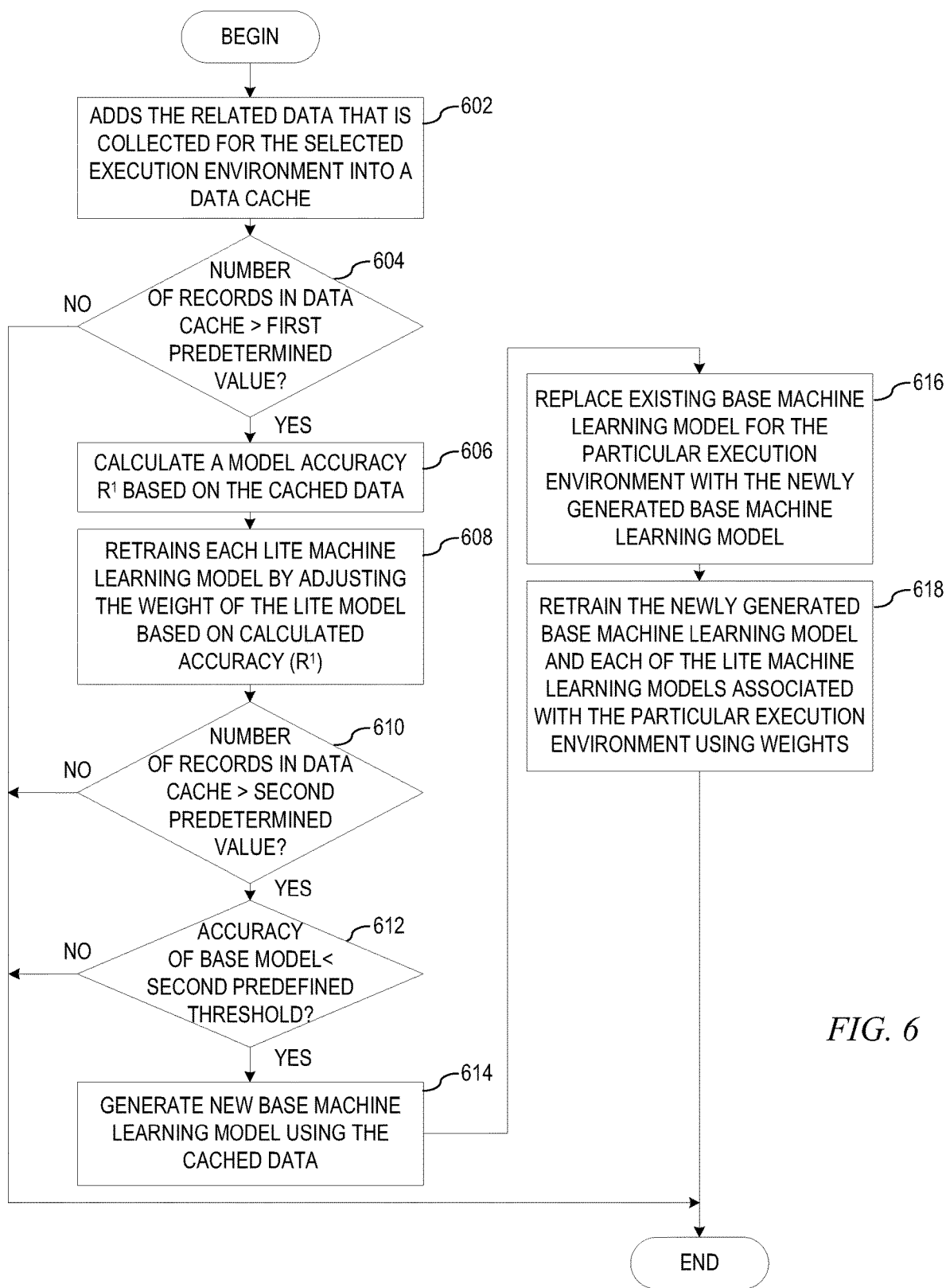
FIG. 6 depicts one example of a flow diagram of the operation performed by a machine learning model update engine in updating the machine learning models utilized by the execution environment selection engine in identifying an execution environment for execution of a new computing job in accordance with an illustrative embodiment.

FIG. 6 depicts one example of a flow diagram of the operation performed by a machine learning model update engine in updating the machine learning models utilized by the execution environment selection engine in identifying an execution environment for execution of a new computing job in accordance with an illustrative embodiment. Again, the related data that is collected for the selected execution environment in step 416 of FIG. 4 may be indicative of change in the execution environment since the test cases were run or since the last time user submitted computing job was executed, such as difference in hardware: virtual machine versus physical hardware, hard disk drive versus solid state drive, or the like; an update in a dependency library: optimization, central processing unit versus graphics processing unit; hardware replacement and improvement; or the like. Thus, to account for the changes that may incur in an execution environment, as the operation begins, the machine learning model update engine adds the related data that is collected for the selected execution environment, i.e. the collected execution context information for the new computing job, the key parameters, the execution environment information for the selected execution environment and the observed execution time, into a data cache (step 602). The machine learning model update engine determines whether the number of records in the data cache is larger than a first predetermined value (step 604). If at step 604 the number of records in the data cache fails to be larger than the first predetermined value, the operation terminates. If at step 604 the number of records in the data cache is larger than the first predetermined value, the machine learning model update engine calculates a model accuracy R$^1$ based on the cached data (step 606). The machine learning model update engine then retrains each lite machine learning model by adjusting the weight of the lite model based on calculated accuracy (R$^1$) (step 608) using the following formula:

$$adjWLM_i = \frac{R_i^1}{\sum_n R_n^1} * \sum_n WLM_n$$

For the base machine learning model, the machine learning model update engine then determines whether the number of records in the data cache is larger than a second predetermined value (step 610). If at step 610 the number of records in the data cache fails to be larger than the second predetermined value, the operation terminates. If at step 610 the number of records in the data cache is larger than the second predetermined value, the machine learning model update engine determines whether an accuracy of base model is less than a second predefined threshold ($T_{acc2}$) (step 612). If at step 612 the accuracy of the base model is equal to or above the second predefined threshold ($T_{acc2}$) the operating terminates. If at step 612 the accuracy of the base model is less than the second predefined threshold ($T_{acc2}$), the machine learning model update engine generates a new base machine learning model using the cached data (step 614). The machine learning model update engine then replaces existing base machine learning model for the particular execution environment with the newly generated base machine learning model for the particular execution environment in the set of machine learning models (step 616). The machine learning model update engine may also retrain the newly generated base machine learning model and each of the lite machine learning models associated with the particular execution environment by either assigning new weight for selected machine learning models using the previously described weight adjustment formula or using the formula previously used for initial weight determination used during initial training of the base machine learning model and the lite machine learning models for the particular execution environment (step 618), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for intelligently identifying an execution environment to execute a computing job. The mechanisms build machine learning models to reflect the relationship between job execution time and execution context, such as execution environment, input data information, key parameters, or the like. The mechanisms then estimate an execution time for executing the execution flow of the computing job in each candidate execution environment of a plurality of execution environments based on machine learning models for each execution environment in the plurality of execution environments in order to provide several combinations of execution environments and execution times as options for selection before the actual computing job execution. That is, the mechanisms may inform the user of job magnitude (heavyweight or lightweight) and an estimated execution time on all available candidate execution environments, so that the user may select a suitable execution environment based on performance or so that the mechanisms may automatically select an execution environment based on predefined user preferences. After each computing job execution in a selected execution environment, the mechanisms collect execution information and refresh the associated machine learning models.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for intelligently identifying an execution environment to execute a computing job, the method comprising:
for each execution environment of a plurality of execution environments:
predicting an execution time of the computing job in the execution environment by applying a set of machine learning models matching execution context information and key parameters of the computing job and execution environment information of the execution environment; and
aggregating the predicted execution time of the machine learning models thereby forming an aggregated predicted execution time for the computing job in the execution environment;
summarizing the aggregated predicted execution times of the computing job for the plurality of execution environments;
responsive to a selection of a selected execution environment from the plurality of execution environments based on the summary of the aggregated predicted execution times of the computing job, executing the computing job in the selected execution environment; and
collecting related data during the execution of the computing job in the selected execution environment, wherein the set of machine learning models are generated at least by:
executing each test case, in a plurality of test cases, in each execution environment of the plurality of execution environments, utilizing collected execution context information for each test case in a plurality of test cases and execution environment information for each execution environment of the plurality of execution environments; and
generating the set of machine learning models based on a relationship between execution time of each test case in an associated execution environment and an execution context of an associated test case.

2. The method of claim 1, wherein the selection of the execution environment from the plurality of execution environments based on the summary of aggregated predicted execution times of the computing job is either a user selection or an automated selection based on predefined user preferences.

3. The method of claim 1, wherein the execution context information comprises at least one of: a size of input data; number of fields; number of categorical fields; number of continuous fields; univariate statistics of categorical fields; or univariate statistics of continuous fields.

4. The method of claim 1, wherein the key parameters are identified based on values associated with the execution context information for the computing job.

5. The method of claim 1, wherein the execution environment information is selected from the group comprising: number of processors, characteristics of the processors, memory size, software development information, and operation system information.

6. The method of claim 1, wherein the set of machine learning models are further generated at least by:
identifying key parameters using values associated with each of the execution context information for the plurality of test cases; and
assigning an initial weight to each machine learning model in the set of machine learning models.

7. The method of claim 6, wherein the set of machine learning models for each execution environment of the plurality of execution environments comprises:
one base machine learning model that uses all of the execution context information of the test case, values associated with each of the execution context information of the test case, and all associated execution environment information; and
at least one lite machine learning model that includes some but not all of the execution context information of the test case, values associated with each of the execution context information of the test case, and all associated execution environment information.

8. The method of claim 1, further comprising updating the set of machine learning models utilized in identifying an execution environment to execute the computing job at least by:
adding the related data that is collected for the selected execution environment into a data cache;
responsive to a number of records in the data cache being larger than a first predetermined value:
calculating a model accuracy based on the cached data; and
retraining at least one lite machine learning model in the set of machine learning models by adjusting a weight of the lite machine learning model based on the calculated model accuracy; and
responsive to the number of records in the data cache being larger than a second predetermined value:
determining whether an accuracy of a base model in the set of machine learning models is less than a predefined threshold ($T_{acc}$);
responsive to the accuracy of the base model being less than the predefined threshold ($T_{acc}$), generating a new base machine learning model using the cached data; and
replacing an existing base machine learning model for the associated execution environment with the newly generated base machine learning model for the associated execution environment in the set of machine learning models.

9. The method of claim 8, further comprising:
retraining the newly generated base machine learning model and each of the lite machine learning models associated with the execution environment by assigning new weights.

10. A computer program product comprising a computer readable storage medium having a computer readable program for intelligently identifying an execution environment to execute a computing job stored therein, wherein the computer readable program, when executed on a computing device, causes the computing device to:
for each execution environment of a plurality of execution environments:
predict an execution time of the computing job in the execution environment by applying a set of machine learning models matching execution context information and key parameters of the computing job and execution environment information of the execution environment; and
aggregate the predicted execution time of the machine learning models thereby forming an aggregated predicted execution time for the computing job in the execution environment;
summarize the aggregated predicted execution times of the computing job for the plurality of execution environments;

responsive to a selection of a selected execution environment from the plurality of execution environments based on the summary of the aggregated predicted execution times of the computing job, execute the computing job in the selected execution environment; and collect related data during the execution of the computing job in the selected execution environment, wherein the set of machine learning models are generated at least by:

executing each test case, in a plurality of test cases, in each execution environment of the plurality of execution environments, utilizing collected execution context information for each test case in a plurality of test cases and execution environment information for each execution environment of the plurality of execution environments; and generating the set of machine learning models based on a relationship between execution time of each test case in an associated execution environment and an execution context of an associated test case.

11. The computer program product of claim 10, wherein the selection of the execution environment from the plurality of execution environments based on the summary of aggregated predicted execution times of the computing job is either a user selection or an automated selection based on predefined user preferences.

12. The computer program product of claim 10, wherein:
the execution context information comprises at least one of: a size of input data; number of fields; number of categorical fields; number of continuous fields; univariate statistics of categorical fields; or univariate statistics of continuous fields;

the key parameters are identified based on values associated with the execution context information for the computing job; and the execution environment information is selected from the group comprising: number of processors, characteristics of the processors, memory size, software development information, and operation system information.

13. The computer program product of claim 10, wherein the set of machine learning models are further generated at least by:
identifying key parameters using values associated with each of the execution context information for the plurality of test cases; and assigning an initial weight to each machine learning model in the set of machine learning models.

14. The computer program product of claim 13, wherein the set of machine learning models for each execution environment of the plurality of execution environments comprises:
one base machine learning model that uses all of the execution context information of the test case, values associated with each of the execution context information of the test case, and all associated execution environment information; and at least one lite machine learning model that includes some but not all of the execution context information of the test case, values associated with each of the execution context information of the test case, and all associated execution environment information.

15. The computer program product of claim 10, wherein the computer readable program updates the set of machine learning models utilized in identifying an execution environment to execute the computing job by further causing the computing device to:
add the related data that is collected for the selected execution environment into a data cache;

responsive to a number of records in the data cache being larger than a first predetermined value:
calculate a model accuracy based on the cached data; and retrain at least one lite machine learning model in the set of machine learning models by adjusting a weight of the lite machine learning model based on the calculated model accuracy; and responsive to the number of records in the data cache being larger than a second predetermined value:
determine whether an accuracy of a base model in the set of machine learning models is less than a predefined threshold ($T_{acc}$);

responsive to the accuracy of the base model being less than the predefined threshold ($T_{acc}$), generate a new base machine learning model using the cached data; and replace an existing base machine learning model for the associated execution environment with the newly generated base machine learning model for the associated execution environment in the set of machine learning models.

16. The computer program product of claim 15, wherein the computer readable program further causes the computing device to:
retrain the newly generated base machine learning model and each of the lite machine learning models associated with the execution environment by assigning new weights.

17. An apparatus for intelligently identifying an execution environment to execute a computing job comprising:
a processor; and
a memory coupled to the processor, wherein the memory comprises instructions which, when executed by the processor, cause the processor to:
for each execution environment of a plurality of execution environments:
predict an execution time of the computing job in the execution environment by applying a set of machine learning models matching execution context information and key parameters of the computing job and execution environment information of the execution environment; and aggregate the predicted execution time of the machine learning models thereby forming an aggregated predicted execution time for the computing job in the execution environment;

summarize the aggregated predicted execution times of the computing job for the plurality of execution environments;

responsive to a selection of a selected execution environment from the plurality of execution environments based on the summary of the aggregated predicted execution times of the computing job, execute the computing job in the selected execution environment; and collect related data during the execution of the computing job in the selected execution environment, wherein the set of machine learning models are generated at least by:
executing each test case, in a plurality of test cases, in each execution environment of the plurality of execution environments, utilizing collected execution context information for each test case in a plurality of test cases and execution environment information for each execution environment of the plurality of execution environments; and generating the set of machine learning models based on a relationship between execution time of each test case in an associated execution environment and an execution context of an associated test case.

18. The apparatus of claim 17, wherein the selection of the execution environment from the plurality of execution environments based on the summary of aggregated predicted execution times of the computing job is either a user selection or an automated selection based on predefined user preferences.

19. The apparatus of claim 17, wherein:
the execution context information comprises at least one of: a size of input data; number of fields; number of categorical fields; number of continuous fields; univariate statistics of categorical fields; or univariate statistics of continuous fields;
the key parameters are identified based on values associated with the execution context information for the computing job; and
the execution environment information is selected from the group comprising: number of processors, characteristics of the processors, memory size, software development information, and operation system information.

20. The apparatus of claim 17, wherein the set of machine learning models are further generated at least by:
identifying key parameters using values associated with each of the execution context information for a plurality of test cases; and
assigning an initial weight to each machine learning model in the set of machine learning models.

21. The apparatus of claim 20, wherein the set of machine learning models for each execution environment of the plurality of execution environments comprises:
one base machine learning model that uses all of the execution context information of the test case, values associated with each of the execution context information of the test case, and all associated execution environment information; and
at least one lite machine learning model that includes some but not all of the execution context information of the test case, values associated with each of the execution context information of the test case, and all associated execution environment information.

22. The apparatus of claim 17, wherein the instructions update the set of machine learning models utilized in identifying an execution environment to execute the computing job by further causing the processor to:
add the related data that is collected for the selected execution environment into a data cache;
responsive to a number of records in the data cache being larger than a first predetermined value:
calculate a model accuracy based on the cached data; and
retrain at least one lite machine learning model in the set of machine learning models by adjusting a weight of the lite machine learning model based on the calculated model accuracy; and
responsive to the number of records in the data cache being larger than a second predetermined value:

determine whether an accuracy of a base model in the set of machine learning models is less than a predefined threshold ($T_{acc}$);
responsive to the accuracy of the base model being less than the predefined threshold ($T_{acc}$), generate a new base machine learning model using the cached data; and
replace an existing base machine learning model for the associated execution environment with the newly generated base machine learning model for the associated execution environment in the set of machine learning models.

23. The apparatus of claim 22, wherein the instructions further cause the processor to:
retrain the newly generated base machine learning model and each of the lite machine learning models associated with the execution environment by assigning new weights.

24. A method, in a data processing system, for intelligently identifying an execution environment to execute a computing job, the method comprising:
for each execution environment of a plurality of execution environments:
predicting an execution time of the computing job in the execution environment by applying a set of machine learning models matching execution context information and key parameters of the computing job and execution environment information of the execution environment; and
aggregating the predicted execution time of the machine learning models thereby forming an aggregated predicted execution time for the computing job in the execution environment;
summarizing the aggregated predicted execution times of the computing job for the plurality of execution environments;
responsive to a selection of a selected execution environment from the plurality of execution environments based on the summary of the aggregated predicted execution times of the computing job, executing the computing job in the selected execution environment;
collecting related data during the execution of the computing job in the selected execution environment; and
updating the set of machine learning models utilized in identifying an execution environment to execute the computing job at least by:
adding the related data that is collected for the selected execution environment into a data cache;
responsive to a number of records in the data cache being larger than a first predetermined value:
calculating a model accuracy based on the cached data; and
retraining at least one lite machine learning model in the set of machine learning models by adjusting a weight of the lite machine learning model based on the calculated model accuracy; and
responsive to the number of records in the data cache being larger than a second predetermined value:
determining whether an accuracy of a base model in the set of machine learning models is less than a predefined threshold ($T_{acc}$);
responsive to the accuracy of the base model being less than the predefined threshold ($T_{acc}$), generating a new base machine learning model using the cached data; and
replacing an existing base machine learning model for the associated execution environment with the newly generated base machine learning model for the associated execution environment in the set of machine learning models.

25. A computer program product comprising a computer readable storage medium having a computer readable program for intelligently identifying an execution environment to execute a computing job stored therein, wherein the computer readable program, when executed on a computing device, causes the computing device to:

for each execution environment of a plurality of execution environments:
  predict an execution time of the computing job in the execution environment by applying a set of machine learning models matching execution context information and key parameters of the computing job and execution environment information of the execution environment; and
  aggregate the predicted execution time of the machine learning models thereby forming an aggregated predicted execution time for the computing job in the execution environment;
summarize the aggregated predicted execution times of the computing job for the plurality of execution environments;
responsive to a selection of a selected execution environment from the plurality of execution environments based on the summary of the aggregated predicted execution times of the computing job, execute the computing job in the selected execution environment;
collect related data during the execution of the computing job in the selected execution environment; and
update the set of machine learning models utilized in identifying an execution environment to execute the computing job at least by:
  adding the related data that is collected for the selected execution environment into a data cache;
  responsive to a number of records in the data cache being larger than a first predetermined value:
    calculating a model accuracy based on the cached data; and
    retraining at least one lite machine learning model in the set of machine learning models by adjusting a weight of the lite machine learning model based on the calculated model accuracy; and
  responsive to the number of records in the data cache being larger than a second predetermined value:
    determining whether an accuracy of a base model in the set of machine learning models is less than a predefined threshold ($T_{acc}$);
    responsive to the accuracy of the base model being less than the predefined threshold ($T_{acc}$), generating a new base machine learning model using the cached data; and
    replacing an existing base machine learning model for the associated execution environment with the newly generated base machine learning model for the associated execution environment in the set of machine learning models.

* * * * *